(12) United States Patent
Russell et al.

(10) Patent No.: US 12,235,200 B2
(45) Date of Patent: Feb. 25, 2025

(54) APPARATUS AND METHODS FOR PARTICLE TESTING

(71) Applicant: MAX-PLANCK-GESELLSCHAFT ZUR FOERDERUNG DER WISSENSCHAFTEN E.V., Munich (DE)

(72) Inventors: Philip Russell, Roettenbach (DE); Richard Zeltner, Erlangen (DE); Shangran Xie, Erlangen (DE); Abhinav Sharma, Erlangen (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 504 days.

(21) Appl. No.: 17/438,710

(22) PCT Filed: Mar. 9, 2020

(86) PCT No.: PCT/EP2020/056232
§ 371 (c)(1),
(2) Date: Sep. 13, 2021

(87) PCT Pub. No.: WO2020/182742
PCT Pub. Date: Sep. 17, 2020

(65) Prior Publication Data
US 2022/0146394 A1    May 12, 2022

(30) Foreign Application Priority Data
Mar. 13, 2019 (EP) .................................. 19162592

(51) Int. Cl.
*G01N 15/02* (2024.01)
*G01N 1/22* (2006.01)
(Continued)

(52) U.S. Cl.
CPC ....... *G01N 15/0211* (2013.01); *G01N 1/2273* (2013.01); *G01N 15/1434* (2013.01);
(Continued)

(58) Field of Classification Search
CPC ............. G01N 15/0211; G01N 1/2273; G01N 15/1434; G01N 15/1459; G01N 2015/0046; G01N 2015/1493; G01N 2015/0038
See application file for complete search history.

(56) References Cited

U.S. PATENT DOCUMENTS 3,808,432 A  *  4/1974  Ashkin .................... G21B 1/15
                                                            376/101
7,228,053 B1 *  6/2007  Palti ...................... B65G 54/00
                                                            385/125
(Continued)

FOREIGN PATENT DOCUMENTS

CN    102334021 A1   1/2012
EP       2835674      2/2015
(Continued)

OTHER PUBLICATIONS

Sharma et al. "On-the-fly particle metrology in hollow-core photonic crystal fibre" (2019), Applied Physics, arXiv:1907.09469.*
(Continued)

*Primary Examiner* — Mohamed K Amara
(74) *Attorney, Agent, or Firm* — Caesar Rivise, PC

(57) ABSTRACT

A particle testing apparatus, being configured for investigating particles in a fluid medium, includes a waveguide device having a hollow optical waveguide with an input end and an output end, an irradiation device including a laser source being arranged for optically trapping at least one particle at the input end of the optical waveguide and propelling the particle through the optical waveguide toward
(Continued)

the output end thereof, and a measuring device being arranged for sensing the at least one particle in the optical waveguide, wherein the measuring device is arranged for measuring an optical transmission of the optical waveguide. Furthermore, a particle testing apparatus is described.

12 Claims, 3 Drawing Sheets

(51) Int. Cl.
*G01N 15/0205* (2024.01)
*G01N 15/14* (2006.01)
*G01N 15/1434* (2024.01)
*G01N 15/00* (2006.01)

(52) U.S. Cl.
CPC . *G01N 15/1459* (2013.01); *G01N 2015/0046* (2013.01); *G01N 2015/1493* (2013.01)

(56) References Cited

U.S. PATENT DOCUMENTS

| | | | | |
|---|---|---|---|---|
| 7,444,053 | B2 * | 10/2008 | Schmidt | G02B 6/125 385/129 |
| 8,552,363 | B2 | 10/2013 | Erickson et al. | |
| 8,865,271 | B2 * | 10/2014 | Bi | C03B 37/0142 427/569 |
| 9,057,825 | B2 * | 6/2015 | Erickson | B01L 3/502761 |
| 9,267,891 | B2 * | 2/2016 | Schmidt | G01N 21/53 |
| 9,594,071 | B2 * | 3/2017 | Hart | B01L 3/502776 |
| 9,826,614 | B1 * | 11/2017 | Bakeman | G21K 7/00 |
| 9,851,290 | B2 * | 12/2017 | Zhan | G01N 21/59 |
| 10,989,724 | B1 * | 4/2021 | Holmes | G01N 35/10 |
| 2006/0251371 | A1 * | 11/2006 | Schmidt | G01N 21/6454 385/129 |
| 2007/0242719 | A1 * | 10/2007 | Spoonhower | H01S 5/36 372/50.124 |
| 2009/0032730 | A1 | 2/2009 | Erickson et al. | |
| 2009/0175586 | A1 | 7/2009 | Schmidt et al. | |
| 2012/0307035 | A1 * | 12/2012 | Yaqoob | G01B 9/02084 348/79 |
| 2013/0252237 | A1 * | 9/2013 | Wagner | G01N 15/1434 435/6.1 |
| 2014/0313510 | A1 * | 10/2014 | Schmidt | G01N 21/49 356/338 |
| 2014/0347641 | A1 * | 11/2014 | Koek | G03F 7/7015 29/592 |
| 2018/0019095 | A1 * | 1/2018 | Peto | H01J 37/08 |
| 2018/0243740 | A1 * | 8/2018 | Schmidt | H01P 3/12 |
| 2020/0254420 | A1 * | 8/2020 | Kinzer | H01Q 1/26 |
| 2020/0284783 | A1 * | 9/2020 | Schmidt | G01N 35/00 |
| 2022/0317012 | A1 * | 10/2022 | Cole | G01N 21/53 |
| 2023/0393164 | A1 * | 12/2023 | Kehoe | G01N 35/08 |

FOREIGN PATENT DOCUMENTS

| | | |
|---|---|---|
| WO | WO2006/110749 A2 | 10/2006 |
| WO | WO2010/099118 A1 | 9/2010 |

OTHER PUBLICATIONS

Dawson et al. "The Rise of the OM-LoC: Opto-Microfluidic Enabled Lab-on-Chip", Micromachines (Basel) (2021), 12(12); 1467.*
International Search Report for corresponding PCT Application No. PCT/EP2020/056232 dated Jun. 5, 2020.
Benabid et al., "Particle Levitation and Guidance in Hollow-Core Photonic Crystal Fiber", Optics Express, vol. 10, No. 21, pp. 1195-1203, Oct. 21, 2002.
Gao et al., "A High-Sensitivity Low-Cost Optical Particle Counter Design", Aerosol Science and Technology, vol. 47, Issue 2, pp. 137-145, 2013.
"Handheld Particle Counter Model 804", Met One Instruments, retrieved on Sep. 8, 2021 from https://metone.com/products/model-804-handheld-particle-counter/.
Schmidt et al., "Metrology of Laser-Guided Particles in Air-Filled Hollow-Core Photonic Crystal Fiber", Optics Letters, vol. 37, No. 1, pp. 91-93, Jan. 1, 2012.
Unterkofler et al., Long-Distance Laser Propulsion and Deformation-Monitoring of Cells in Optofluidic Photonic Crystal Fiber, Journal of Biophotnics, 1-10 (2012).
Yu et al., "Optically Sizing Single ALight: Science & Applicationstmospheric Particulates With a 10-nm Resolution Using a Strong Evanescent Fileld", Light: Science & Applications (2018) 7, 18003.
Office Action from corresponding Chinese Application No. 202080020942.X dated Oct. 20, 2023.
Garbos et al., "Optofluidic Immobility of Particles Trapped in Liquid-Filled Hollow-Core Photonic Crystal Fiber", Optics Express, vol. 19, No. 20, pp. 19643-19652 (2011).

* cited by examiner

APPARATUS AND METHODS FOR PARTICLE TESTING

CROSS-REFERENCE TO RELATED APPLICATIONS

This application is a U.S. National Phase Application under 35 U.S.C. § 371 of PCT/EP2020/056232, filed Mar. 9, 2020, which claims priority from European Patent Application No. 19162592.0, filed Mar. 13, 2019, the contents of which applications are incorporated herein by reference in their entireties.

FIELD OF THE INVENTION

The invention relates to a particle testing apparatus for investigating particles in a fluid medium, e. g. a gaseous or liquid environment, in particular employing a detection of particles propelled in a hollow gas- or liquid-filled optical waveguide. Furthermore, the invention relates to a particle testing method for investigating particles in a fluid medium. Applications of the invention are available e. g. in the fields of environmental or material investigations or monitoring chemical or physical processes.

TECHNICAL BACKGROUND

In the present specification, reference is made to the following prior art illustrating technical background of the invention and related techniques:
 [1] R. S. Gao et al. in "Aerosol Science and Technology" 47, 137-145 (2013);
 [2] Met One Instruments: https://metone.com/indoor-controlled-environments/controlled-environments/model-804-handheld-particle-counter/;
 [3] X.-C. Yu et al. in "Light: Science & Applications" 7, 18003 (2018);
 [4] S. Unterkofler et al. in "J. Biophotonics" 1-10 (2012);
 [5] O. A. Schmidt et al. in "Optics Letters" 37, 91 (2012);
 [6] F. Benabid et al. in "Optics Express" 10, 1195 (2002);
 [7] EP 2 835 674 A1;
 [8] WO 2006/110749 A3;
 [9] U.S. Pat. No. 8,552,363 B2; and
 [10] US 2009/0175586 A1.

It is generally known that increasing pollution of the environment with contaminants, like fine dust and other particles from technical processes (in particular traffic), creates an increasing need for detecting and investigating airborne particles, e. g. in the atmosphere. Furthermore, there is an interest in detecting particles in local environments, e. g. in a closed room or a reaction vessel.

A broad range of particle sensing methods are known, including optical measurements, wherein particles are detected based on an interaction with light.

Two examples of known optical measurements, including free-space scattering-based detection and waveguide scattering-based detection, are schematically illustrated in FIG. 6 (prior art). Free-space scattering-based detection (FIG. 6A, see e. g. [1]) employs a combination of a probe laser 20' and a photo-detector 30' being arranged in a sample chamber. Particles 1' crossing a laser beam path 10' between the probe laser 20' and the photo-detector 30' partially scatter the laser beam, allowing the number of airborne particles to be counted.

Although the system of FIG. 6A is well-established and commercially available [2], the free-space configuration may have the following disadvantages. Firstly, particles with the same size may pass through the laser beam of the probe laser 20' (normally with a Gaussian intensity profile) at different positions over the profile, causing different amounts of scattered light. As a consequence, this approach can only count the particle number, but not precisely determine the particle size. Furthermore, particles are required to feed to the sample chamber by means of a carefully aligned gas-jet to ensure overlap with the laser beam. Any misalignment causing deviations of the passing point of the particles 1' through the laser beam path 10' will increase the measurement uncertainty.

With the waveguide scattering-based detection (FIG. 6B, see e. g. [3]), a tapered waveguide 11' is arranged between a probe laser 20' and a photo-detector 30'. The laser beam is coupled into the tapered waveguide 11'. Particles 1 attaching on the outer surface of the waveguide 11' interact with the evanescent field of the guided mode and thus scatter a fraction of the light which can be detected as a transmission drop at the photo-detector 30'.

Contrary to the technique of FIG. 6A, the waveguide scattering-based detection allows both to count the particle number as well as determining the particle's size. However, the following disadvantages may occur in applying the technique of FIG. 6B. Over prolonged operation the continuous attachment of particles on the tapered waveguide 11' will severely degrade the transmission of the waveguide 11' and thus the sensing capability thereof. Even in the absence of particle attachment, the tapered waveguide will degrade over time. Therefore the overall lifetime of the device is strictly limited. Furthermore, for reproducible measurements it must be ensured that the particles attach to a pre-defined area of the waveguide. As a further limitation, the drop in fibre transmission only occurs at the instant when the particle attaches to the waveguide 11'. Therefore the system is very sensitive to any external perturbations (e.g. laser intensity or photo-detector noises) with similar features, increasing the rate of fault detection.

Further optical measurements utilizing optical waveguides are described in [4] to [7] and [10], wherein particles are moved within a waveguide in a gas or liquid filled condition. In [4], biological cells in a liquid suspension are trapped in a hollow fibre with a distance from the inner fibre wall. The cells are analyzed by complex Doppler-velocimetric measurements. According to [5] or [10], particles are trapped in a dual-beam trap formed with counter-propagating Gaussian laser beams and the particles are moved in an air-filled hollow-core photonic crystal fibre by shifting the dual-beam trap. Similarly, particles are manipulated in an air-filled hollow fibre by employing a laser tweezer in [6]. According to [7], particles in an optical fibre are used as a sensor element for detecting an environmental condition. The optical measurements of [4] to [7] and [10] allow detecting particle properties. However, due to the complex methods of manipulating and sensing the particles, there are substantial restrictions for practical routine applications for investigating e. g. airborne particles. According to [10], a transmission measurement is proposed which is implemented by adding another solid-core waveguide which intersects with the hollow waveguide in the orthogonal direction. This allows sensing particle properties in a restricted manner only.

Manipulating particles in optical fibres has also been described with reference to an optical chromatography system ([8]) and a system for sorting of particles in a fluid medium ([9]). However, these systems do not allow investigating particles in a gaseous environment, in particular for determining the number or size thereof.

Objective of the Invention

Objectives of the invention are to provide an improved particle testing apparatus and/or method for investigating particles in a fluid medium, like a gaseous or liquid environment, being capable of avoiding limitations and disadvantages of conventional techniques. In particular, the particle testing apparatus and/or method is to be capable of sensing particles with reduced complexity of the device configuration, improved reliability, improved precision, extended lifetime of the apparatus and/or extended applications, e. g. routine applications in environmental or other technical process related tests. For example, the particle testing apparatus is to be capable of counting particles and determining the particle size with improved precision and/or sensing further particle features.

SUMMARY OF THE INVENTION

These objectives are solved by a particle testing apparatus and/or a particle testing method comprising the features of the independent claims. Advantageous embodiments and applications of the invention are defined in the dependent claims.

According to a first general aspect of the invention, the above objective is solved by a particle testing apparatus for investigating particles in a fluid medium, like a gaseous or liquid environment, which comprises a waveguide device, an irradiation device and a measuring device. The term "particle testing" refers to sensing at least one particle feature of particles included in a gaseous sample (gas or vapour sample) or a liquid sample.

The waveguide device comprises a hollow, straight or curved optical waveguide longitudinally extending from a first end to a second end. With reference to at least one particle's introduction into the optical waveguide and output out of the optical waveguide, the first and second ends are called input and output ends, respectively. The optical waveguide is a hollow waveguide, which is in a gas- or liquid-filled condition, i. e. an inner hollow space of the optical waveguide includes any gas or vapour or liquid allowing a transport of at least one particle through the optical waveguide, e. g. a gas or vapour or liquid sample from a volume to be tested. Preferably, the optical waveguide is a hollow core photonic crystal fibre (HC-PCF) being capable of containing a gas or vapour or liquid. Alternatively, other types of hollow optical waveguides can be employed, being capable of guiding light, like other hollow optical fibres. Preferably, the core diameter of the optical waveguide is selected in a range from 5 μm to 50 μm, in particular from 10 μm to 20 μm.

The irradiation device comprises a laser source being arranged for focused irradiation of the input end of the optical waveguide, in particular for optically trapping at least one particle at the input end, introducing at least one trapped particle into the optical waveguide and propelling it along the optical waveguide toward the output end thereof. The irradiation device is arranged for focused irradiation of the input end of the optical waveguide preferably from only one side thereof. The laser source preferably has a wavelength in a range from 400 nm to 2 μm, particularly preferred in the visible or NIR wavelength range, and it may comprise a continuous wave laser source or a pulsed laser source. The measuring device is arranged for optically sensing the at least one particle in the optical waveguide.

In terms of the apparatus, according to the invention, the measuring device is arranged for measuring an optical transmission of the optical waveguide, preferably in a time interval including movement of at least one particle through the optical waveguide. The inventors have found that the occurrence of at least one particle in the optical waveguide causes scattering of the light field propagating in the optical waveguide, thus influencing the optical transmission of the optical waveguide in a specific manner and allowing the provision of at least one particle feature. The measuring device is arranged for sensing light propagation through the optical waveguide. Measuring the optical transmission includes any types of sensing of an amplitude and/or amplitude changes of a light field traveling along the longitudinal extension of the optical waveguide. Preferably, the measuring device is adapted for measuring a time function of the optical transmission. At least one particle feature to be obtained by the inventive apparatus is derived from the measured optical transmission, and it comprises e. g. the number of particles, size of particles and/or refractive index of particles.

According to a second general aspect of the invention, the above objective is solved by a particle testing method for investigating particles in a fluid medium, like a gaseous or liquid environment, comprising the steps of providing a sample including at least one particle at a hollow optical waveguide having an input end and an output end, optically trapping at least one particle at the input end of the optical waveguide and propelling the particle through the optical waveguide toward the output end with a laser source of an irradiation device, and sensing at least one particle in the optical waveguide.

In terms of the method, according to the invention, at least one particle is sensed by measuring optical transmission of the optical waveguide, in particular along the longitudinal extension thereof, while propelling the at least one particle through the optical waveguide for obtaining at least one particle feature. Preferably, the particle testing method is implemented using the particle testing apparatus of the first general aspect of the invention.

Advantageously, the limitations of the conventional techniques can be avoided by the invention of coupling a laser beam from the laser source into the optical waveguide, preferably the hollow-core fibre. The laser source is configured such that the laser beam has high enough optical power to trap particles in front of the end-face of the waveguide input end and then propel it along the hollow core of the waveguide. The optical power can be selected in dependency on the application conditions, e. g. by simulating the interaction of particles expected in a gaseous or liquid sample with the laser beam. Measuring the optical transmission in particular includes detecting a transmission drop and its duration with the measuring device, e. g. a photodetector thereof. Accordingly, at least the particle number can be precisely counted and the particle size(s) can be determined (particle sizing). In particular, the time of flight for the particle travelling through the waveguide can be obtained. The particle number may be used as a qualitative measure for characterizing the sample. Alternatively or additionally, a particle density in the sample can be derived from the counted particle number and reference data, in particular taking into consideration conditions of providing the particles at the input end of the optical waveguide, e. g. in a casing (see below).

Preferably, the optical waveguide is engineered such that it fulfils the following criteria. Firstly, the optical waveguide preferably guides the laser beam with a low transmission loss, i.e. the transmission loss of the optical waveguide without a particle is sufficiently low so that changes of the transmission induced by the occurrence of particles can be sensed. Secondly, the modal area of the optical waveguide preferably is small enough to provide trapping of particles in front of the fibre end-face. Thirdly, the amount of scattered light preferably can give an optimized sizing resolution on the photo-detector by choosing a proper core diameter and transmission characteristic of the optical waveguide, in dependency of the particle diameter and material (refractive index) thereof.

Compared to existing techniques for particle counting and sizing, the inventive system offers in particular the following advantages.

Measuring optical transmission represents a relatively simple, well established measuring technique, in particular allowing the usage of a single photo-detector, like a photodiode, and the provision of a compact device configuration.

The optical force created by the laser beam traps and aligns the particle(s) close to the core centre of the optical waveguide, such that the particles can pass through the entire optical waveguide, in particular the HC-PCF, without attaching on the inner core wall. The particle testing apparatus therefore offers the function of particle counting and sizing without suffering from any waveguide degradation. Thus, the lifetime of the particle testing apparatus is not limited.

The particle(s) to be sensed is/are aligned with the core centre of the optical waveguide by optical forces making their trajectories inside the core highly predictable. This provides the advantage that the same amount of light is scattered from particles of the same material and size. Therefore, the inventive system offers the function of particle sizing with a high accuracy and with fully reproducible results.

The usage of the optical waveguide allows the particle(s) passing through the optical waveguide with a finite time duration given by its traveling speed. Thus, a drop in transmission in the measuring device occurs with a prolonged time window, making the system robust against external perturbations.

The traveling time (time of flight) of the particle(s) through the core of the optical waveguide depends on its size and refractive index, allowing the system to provide additional information on the particle's properties.

The usage of the optical waveguide and the presence of optical trapping forces strongly reduce or even avoid the requirement of a particle-jet alignment with respect to the fibre.

The particle testing can be extended to include single or multiple laser sources, combined with an array of hollow-core optical fibres, to further increase the detection area and efficiency of particle testing.

Finally, the invention has multiple applications including air or water pollution monitoring and/or in-house particle monitoring.

According to a preferred embodiment of the invention, the particle testing apparatus further comprises an analysing device being coupled with the measuring device and being arranged for providing at least one particle feature. The analysing device is adapted for receiving an output signal of the measuring device representing the optical transmission of the waveguide device and for providing the at least one particle feature based on the output signal. Accordingly, the analysing device preferably is a computer running a software calculating the at least one particle feature from the measured optical transmission, based on a predetermined model.

Particularly preferred, the analysing device is adapted for providing at least one of a particle number, a particle size, a particle mass and a particle refractive index as the at least one particle feature. Additionally or alternatively, the analysing device preferably is adapted for providing the at least one particle feature based on particle induced changes of the measured optical transmission. Advantageously, the analysis of the optical transmission is facilitated. In the latter case, according to a particularly preferred embodiment of the invention, the analysing device is adapted for providing at least one particle by analysing the duration, amplitude and/or waveform of the particle induced changes of the measured optical transmission. Advantageously, analysing the output signals of the photo-detector may comprise applying a model which assigns measured values of the drop of transmission and/or the temporal duration of the drop of transmission and/or the temporal shape of the drop of transmission during particle propagation to the occurrence of the particle(s) and the size of the particle(s), thus allowing particle counting and sizing. The model can be based on calibration data collected with reference particles having known particles features and/or on numerical simulations.

According to a particularly preferred embodiment of the invention, the laser source is arranged for both of illuminating the optical waveguide for optically trapping and propelling the at least one particle and for measuring the optical transmission thereof. Thus, the laser source can be provided as a measuring light source of the measuring device. Advantageously, as the laser source fulfills a double function, providing an additional measuring light source can be avoided with this embodiment, so that the complexity of the configuration is further reduced.

Alternatively, the measuring device for measuring an optical transmission can comprise a measuring light source, like a measuring laser source, which is provided additionally to the laser source for optically trapping and propelling the at least one particle. The output emissions of the trapping and propelling laser source and the measuring light source can be superimposed at the input end of the optical waveguide, e. g. with a beam splitter component. Providing separate sources for trapping and propelling or measuring the optical transmission may have advantages in terms of an adaptation of the sources to their function. For example, the laser source for trapping and propelling the at least one particle may have a higher power and higher noise compared with the measuring light source for measuring the optical transmission having less power and less noise. Thus, the signal quality of measuring the transmission can be improved, and the reliability of trapping and propelling the particle is improved simultaneously.

Further particular advantages of the invention are obtained if the particle testing apparatus has at least one of the following features. The irradiation device may comprises a first single mode fibre having an input end and an output end. The input end of the first single mode fibre is coupled with an output of the laser source. A first imaging lens, preferably a first gradient index lens (GRIN lens), is arranged at the output end of the first single mode fibre for focusing the laser light to the input end of the optical waveguide. Advantageously, this configuration improves the efficiency of relaying the laser beam from the laser source to the input end of the optical waveguide and particle trapping. Thus, with a given optical power, larger particles and/or particles with lower refractive index can be trapped, or, for trapping particles with a certain size and refractive index, less optical power can be utilized.

Additionally or alternatively, the measuring device preferably comprises a photodiode and a second single mode fibre having an input end and an output end. The output end of the second single mode fibre is coupled with the photodiode. A second imaging lens, preferably a second GRIN lens, is arranged at the input end of the second single mode fibre for collecting light from the output end of the optical waveguide into the second single mode fibre. Advantageously, by providing the photodiode with the second single mode fibre and the second imaging lens, sensitivity of the transmission measurement can be improved. Using the GRIN lenses has particular advantages in terms of the low size of the lens.

According to a further advantageous embodiment of the invention, the particle testing apparatus comprises a casing (test chamber) containing the optical waveguide. The laser source and the photo-detector of the measuring device are arranged outside the casing. Transparent windows are arranged in a casing wall at opposite sides of the casing for coupling light from the laser source into the casing and light transmitted through the optical waveguide out of the casing. The optical waveguide is positioned in the casing aligned with, but with a distance of the input and output ends from the transparent windows. Furthermore, the casing is adapted for a flow through operation, wherein a gaseous or vapour or liquid sample to be tested flows through the casing. To this end, a supply section is arranged for supplying a sample to be investigated into the casing, and an exhaust section is arranged for guiding the sample out of the casing. Utilizing the casing has particular advantages in terms of providing a protective environment, e. g. protecting the trapping of particles into the optical waveguide against external flows, like wind at environmental measurements, and/or contaminating a measuring site with the sample to be tested.

As a further advantage, the inventive particle testing has a broad range of applications, including monitoring air pollution, e. g. in an atmospheric environment, monitoring gases from machines, in particular vehicles, and/or monitoring type and/or size of dust in an environment.

BRIEF DESCRIPTION OF THE DRAWINGS

Further advantages and details of the invention are described in the following with reference to the attached drawings, which schematically show in.

DETAILED DESCRIPTION OF PREFERRED EMBODIMENTS OF THE INVENTION

Embodiments of the invention are described in the following with particular reference to particle testing using a HC-PCF. The invention is not restricted to this embodiment, but can be implemented with other hollow waveguide types, like capillaries, ARROW waveguides. Details of collecting and optionally further preparing the sample to be tested are not described as sample collection and preparation techniques are known per se from conventional analysing techniques. For instance, the sample can be collected by sucking or collecting a portion of air or other reaction gas or sample liquid from an environment or closed space. The invention is adapted for testing samples in a gaseous or liquid condition. In particular, a liquid sample can be tested directly by guiding the liquid sample through the optical waveguide, or by converting it into the gaseous condition while keeping possible particles within the sample, e.g. using a medical nebulizer.

A single channel embodiment of the inventive particle testing apparatus is described in an exemplary manner. In practical applications of the invention, a multi-channel embodiment of the inventive particle testing apparatus can be provided, including an array of fibres as mentioned below.

Figure 1:
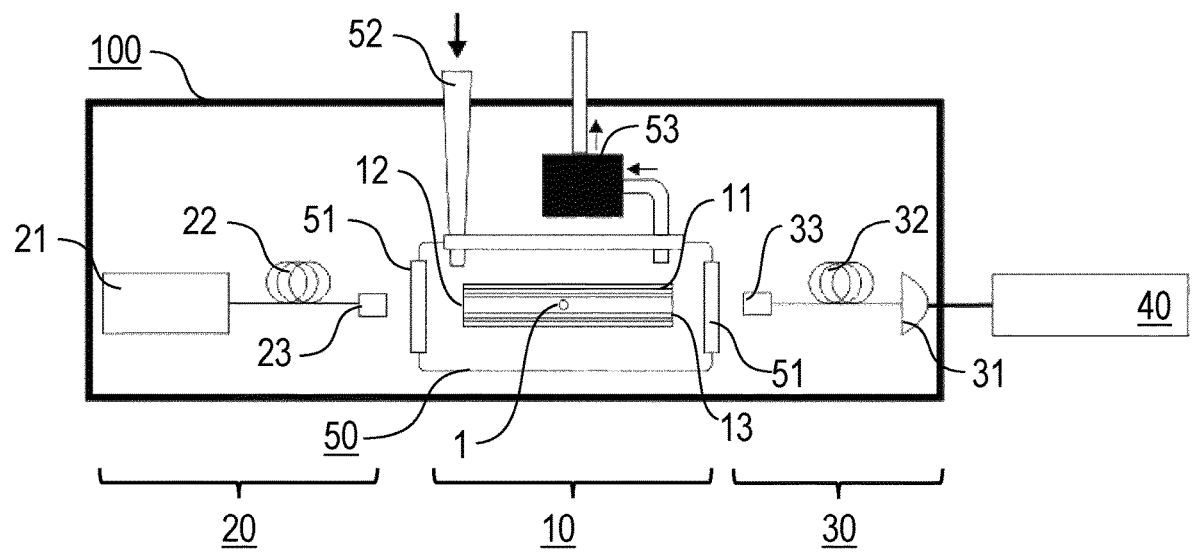
FIG. 1: features of preferred embodiments of a particle testing apparatus according to the invention.

According to FIG. 1, embodiments of a particle testing apparatus 100 include a waveguide device 10 provided by a straight or curved HC-PCF 11 with an input end 12 and an output end 13, an irradiation device 20 with a laser source 21, a first optical fibre 22 and a first GRIN lens 23, and a measuring device 30 with a photodiode 31 or another type pf photo-detector. With a practical example, the HC-PCF 11 has a core diameter of 10 μm to 20 μm. Preferably, the HC-PCF 11 has a length selected such that a travel time of a particle is longer than the time duration needed for the change of transmission at the beginning and the end of a transmission drop caused by the particle, and it is e. g. 5 cm. The laser source 21 is e. g. a fibre laser or fibre coupled diode laser with an emission wavelength of 1064 nm and an output power of 500 mW, providing a light field power at the focus created by the first GRIN lens 23 at the input end 12 of about 400 mW. The laser source 21 can be coupled with the measuring device 30 and/or the analysing device 40, e. g. for adjusting the power of the laser beam and thus the propelling speed of the particles through the HC-PCF 11 in dependency on the waveform of the optical transmission (loop control).

The measuring device 30 is connected with an analysing device 40 for analysing output signals of the photodiode 31. The analysing device 40 is shown as a separate component, provided e. g. by a computer coupled with the photodiode. Alternatively, the function of the analysing device 40 can be provided by a part of the measuring device 30, e. g. a control computer controlling the operation of a photodetector, like the photodiode 31, thereof. Accordingly, the separate analysing device 40 can be considered as an optional feature of the particle testing apparatus 100.

The HC-PCF 11 is arranged in a casing 50 with a casing wall having two transparent windows 51, made of e. g. glass. Preferably, the casing wall is made of a gas and liquid tight material, like a plastic or metal. The casing 50 is provided with a supply section 52 and an exhaust section 53. The supply section 52 comprises e. g. a supply tube (partially shown) or any other opening, which is connected with a space to be examined. A sample containing particles is guided through the supply tube into the casing 50. For driving a flow through the casing 50, the exhaust section 53 comprises a pump sucking gas out of the casing 50. The pump can be coupled with the measuring device 30 and/or the analysing device 40, e. g. for adjusting a flow velocity of the sample through the casing 50 in dependency on a number of particles occurring in the sample (loop control).

The particle testing apparatus 100 provides a system preferably capable of counting and sizing of particles, e. g. airborne particles or particles in an environmental water sample, which consists of the laser source 21, the HC-PCF 11 and the photodiode 31. Particulate matters will enter the casing 50 through the supply section 52 and leave from the other with the help of the pump. This supports a constant gas or vapour flow inside the casing 50. The laser beam created by the laser source 21 traps particles at the input end 12 of the HC-PCF 11, and it is coupled into the core of the HC-PCF 11 and propels the particles along the fibre core of the HC-PCF 11. Within the HC-PCF 11 particles being trapped at the input end 12 are kept in an optical trap perpendicular to the longitudinal extension of the optical waveguide. Propelling is obtained by the effect of radiation pressure of the laser light field in the HC-PCF 11.

Each particle 1 scatters a fraction of the guided core light with the amount of scattered light depending on the particle size and refractive index, such that monitoring the fibre transmission by the photodiode 31 enables real-time counting of the particle number as well as measuring the particle size. Usage of the HC-PCF 11 has the particular advantage that the particles can be aligned and propelled in the hollow core by optical forces, and thus the counting of the particle can be achieved in a non-degradable manner giving an unlimited device lifetime, meanwhile the particle size can be accurately determined, e. g. as described below. The HC-PCF 11 is designed and the wavelength of the laser source 21 is chosen such that the trapping and guidance of the particle 1 inside the core is efficient, meanwhile the amount of scattered light by the particle 1 can give an optimized sizing resolution on the photodiode 31. The transmitted laser beam of the laser source 21 is collected in the photodiode 31 which is connected to a computer for data analysis, like the analysing device 40.

With the multi-channel embodiment of the inventive particle testing apparatus (not shown), multiple HC-PCFs are arranged, e. g. as shown in FIG. 1, each having a core diameter and transmission characteristic optimized for a particular particle type. Each HC-PCF is provided with a separate laser source having a wavelength selected for the particle type to be detected with the related fibre. Advantageously, the multi-channel embodiment of the particle testing apparatus facilitates the detection of an increased number of different particle types within a mixture of particles in a sample.

Particle features can be obtained from the transmission measurement as described in the following with reference to practical results of using the particle testing apparatus 100 of FIG. 1. In particular, a particle number and a particle size can be obtained from measurements as illustrated in FIGS. 2 to 5. Generally, particle counting and sizing is based on detecting an intensity drop and particle time of flight (propagation time) collected with the transmission signal and preliminary calibration or reference measurements. Analysing the output signals of the photo-detector comprises analysing at least one of the drop of transmission, the duration of the transmission drop and the temporal shape of the transmission drop caused by the particle. As the propagation time of the particle through the waveguide typically is less than 1 s, some hundred particles can be sensed per minute.

Figure 2:
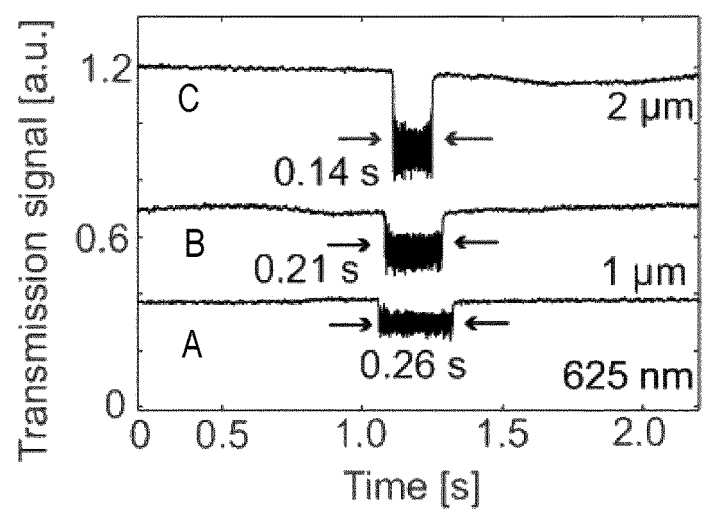
FIGS. 2 to 5: experimental results obtained with embodiments of a particle testing method according to the invention.
Figure 3:
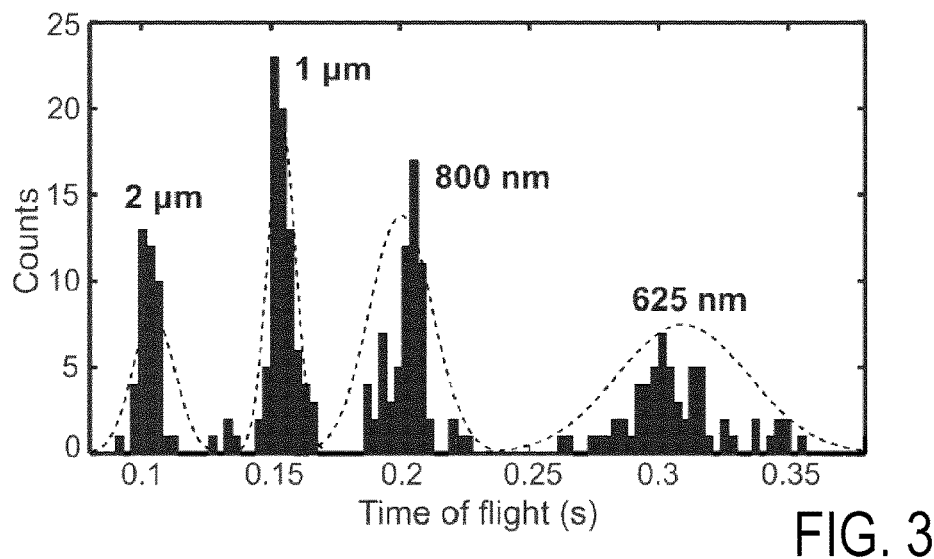
Figure 4:
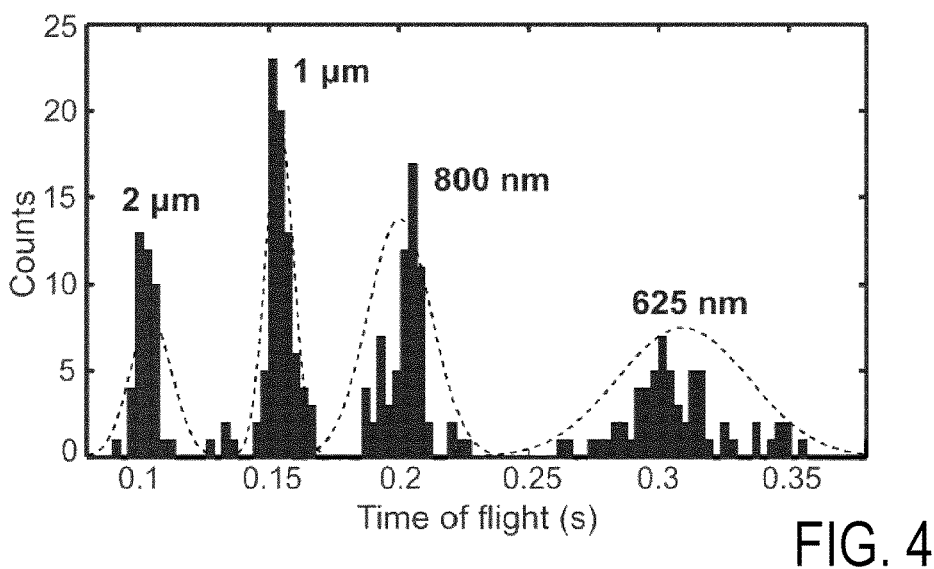

FIG. 2 shows temporal transmission traces collected with the photodiode 31 for polystyrene particles in air with different sizes, including particles of diameter 625 nm (curve A), 1 μm (curve B) and 2 μm (curve C). It is observed that the intensity drop in transmission is highest for 2 μm polystyrene particles followed by 1 μm and 625 nm, hence, showing that the bigger particle scatters more fraction of guided mode of laser light. Also, the time of flight is shorter for bigger particles as bigger particles travel faster inside the hollow fibre 11. Although particles with equal size create slightly differing transmission drops and time of flight values, the measured optical transmission provides a clear differentiation of the particles sizes as shown with FIGS. 3 and 4, which illustrate histograms for the intensity drop and time of flight for different particle sizes.

Figure 5:
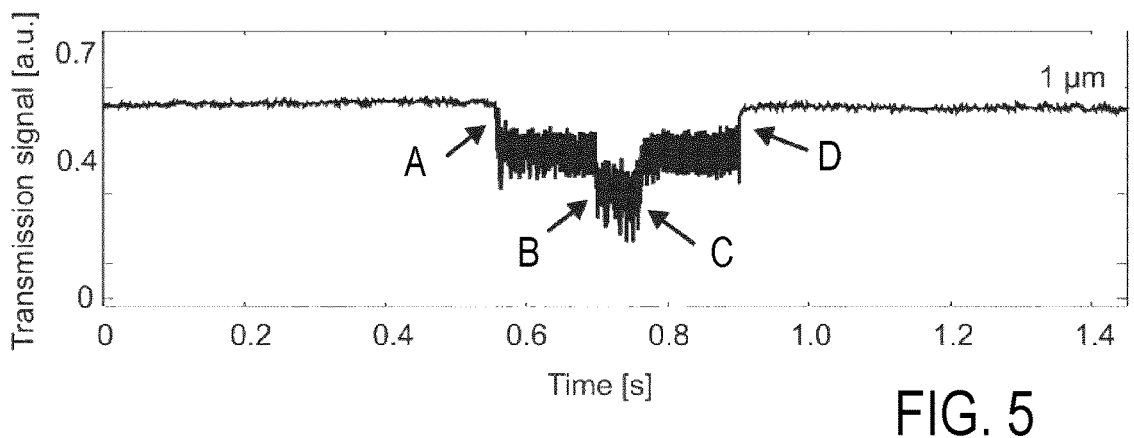
Figure 6:
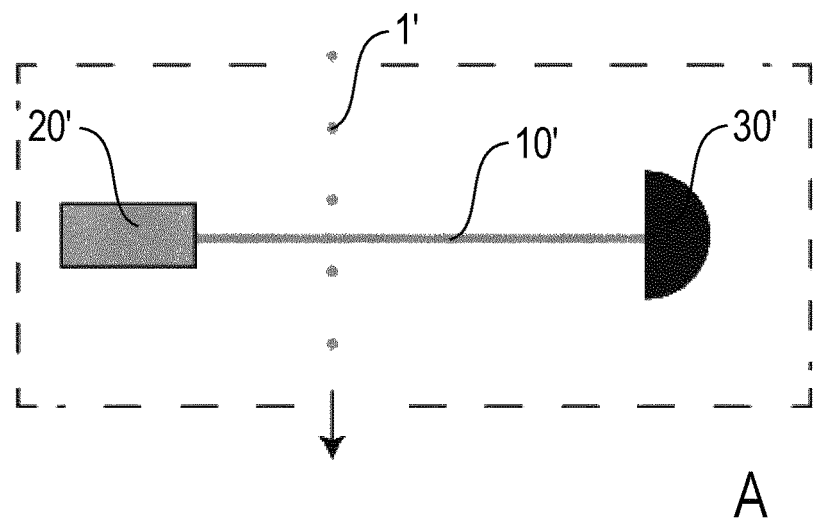
FIG. 6: illustrations of conventional optical measurements of airborne particles (prior art).
Figure 6:
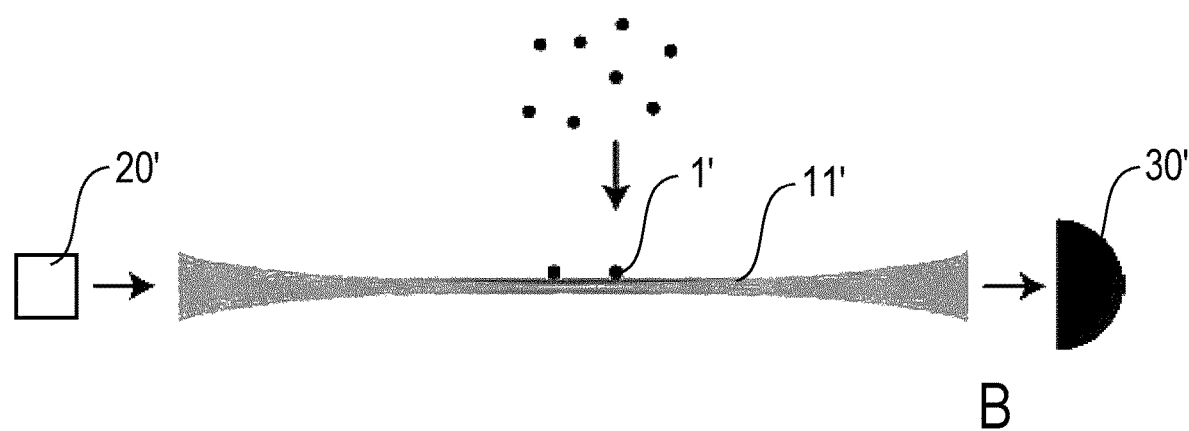

Detecting the presence of more than one particle in the hollow fibre 11 is illustrated in FIG. 5, which plots the collected transmission signal when two 1 μm polystyrene particles propagating through the fibre 11 one after another at the same time. Here at first a single polystyrene particle is trapped showing a first sharp intensity drop for it (A). As this particle propagates through the fibre, a second particle is also trapped and propelled into the fibre before the former one leaves. This is seen by a second sharp intensity drop following the first one (B). As soon as the first particle leaves the fibre the second sharp intensity drop recovers to the first one (C) which is then followed up back to the un-trapped initial transmission state after the second particle leaves the fibre as well (D). Both the intensity drop and the time of flight can be well retrieved from this data.

The features of the invention disclosed in the above description, the drawings and the claims can be of significance both individually as well as in combination or sub-combination for the realization of the invention in its various embodiments. The invention is not restricted to the preferred embodiments described above. Rather a plurality of variants and derivatives is possible which also use the inventive concept and therefore fall within the scope of protection. In addition, the invention also claims protection for the subject and features of the subclaims independently of the features and claims to which they refer.

The invention claimed is:

1. Particle testing apparatus, being configured for investigating particles in a fluid medium, comprising:
   a waveguide device including a hollow optical waveguide having an input end and an output end,
   an irradiation device including a laser source being arranged for optically trapping at least one particle at the input end of the optical waveguide and propelling the particle through the optical waveguide toward the output end thereof, wherein the laser source has high enough optical power to trap particles in front of the waveguide input end and then propel it along the hollow core of the waveguide,
   a measuring device being arranged for sensing the at least one particle in the optical waveguide, and
   an analysing device being coupled with the measuring device and being arranged for providing at least one particle feature, wherein
   the laser source is arranged for focused irradiation of the input end of the optical waveguide from only one side thereof for optically trapping and propelling the at least one particle by the effect of radiation pressure of the laser light field and as a light source of the measuring device for measuring the optical transmission of the optical waveguide,
   the measuring device is arranged for sensing the at least one particle in the optical waveguide by measuring an optical transmission of the optical waveguide along a longitudinal extension thereof,
   the analysing device is adapted for providing the at least one particular feature based on an output of the measuring device and also on at least one of a duration, amplitude and waveform of particle induced changes of the measured optical transmission.

2. Particle testing apparatus according to claim 1, further comprising
   the analysing device is adapted for providing the at least one particle feature based on the optical transmission.

3. Particle testing apparatus according to claim 2, comprising at least one of the features the analysing device is adapted for providing at least one of a particle number, a particle size, a particle mass and a particle refractive index as the at least one particle feature, and the analysing device is adapted for providing the at least one particle feature based on particle induced changes of the measured optical transmission.

4. Particle testing apparatus according to claim 1, including at least one of the features the irradiation device further comprises a first single mode fibre having an input end and an output end, wherein the input end of the first single mode fibre is coupled with an output of the laser source, and a first gradient index lens being arranged at the output end of the first single mode fibre for focusing laser light to the input end of the optical waveguide, and the measuring device comprises a photodiode, a second single mode fibre having an input end and an output end, wherein the output end of the second single mode fibre is coupled with the photodiode, and a second gradient index lens being arranged at the input end of the second single mode fibre for collecting light from the output end of the optical waveguide.

5. Particle testing apparatus according to claim 1, wherein the waveguide device further comprises a casing containing the optical waveguide and having two transparent windows being arranged for coupling light from the laser source into the casing and light transmitted through the optical waveguide out of the casing, wherein the casing is adapted for a flow through operation, wherein a supply section is arranged for supplying a particle containing sample into the casing and an exhaust section is arranged for guiding the sample out of the casing.

6. Particle testing apparatus according to claim 1, wherein the optical waveguide is a hollow core photonic crystal fibre.

7. Particle testing method for investigating particles in a fluid medium, comprising:

providing a sample including at least one particle at a hollow optical waveguide having an input end and an output end;

optically trapping the at least one particle at the input end of the optical waveguide and propelling the particle through the optical waveguide toward the output end with a laser source of an irradiation device, the laser source being used for e tically rapping of the at least one particle and illuminating the optical uide for measuring the optical transmission ereof wherein the laser source provides focused irradiation of the input end of the optical wave guide om only one side thereof for optically trapping and propelling the at least one particle by the effect of radiation pressure of the laser light field and provides a light source of the measuring device for measuring the opt cal transmission of the optic reguide, and the laser source has high enough optical power to trap particles in front of the waveguide input end and then propel it along the hollow core of the waveguide; and sensing the at least one particle in the optical waveguide with a measuring device, wherein the measuring device senses the at least one particle in the optical waveguide by measuring an optical transmission of the optical waveguide along a longitudinal extension thereof, and at least one particle feature is provided by analysing an output of the measuring device, the at least one particle feature being provided based on at least one of a duration, amplitude and waveform of particle induced changes of the measured optical transmission.

8. Particle testing method according to claim 7, including providing the at least one particle feature including at least one of a particle number, a particle size, a particle mass and a particle refractive index as the at least one particle feature.

9. Particle testing method according to claim 8, including the step of providing the at least one particle feature based on particle induced changes of the measured optical transmission.

10. Particle testing method according to claim 7, including at least one of the features the optically trapping of the at least one particle is obtained by illuminating the input end of the optical waveguide by the laser source via a first single mode fibre and a first gradient index lens, and sensing the at least one particle in the optical waveguide is obtained by directing light transmitted through the optical waveguide through a second gradient index lens and a second single mode fibre to a photodiode.

11. Particle testing method according to claim 7, comprising the step of arranging the optical waveguide in a casing having two transparent windows for coupling light from the laser source into the casing and light transmitted through the optical waveguide out of the casing, wherein the casing is adapted for a flow through operation.

12. Particle testing method according to claim 7, wherein the sample is provided for at least one of monitoring environmental air or water pollution, monitoring gases or vapors or liquids emitted from at least one of machines and vehicles, and monitoring at least one of type and size of dust in an environment.

* * * * *